United States Patent [19]

Halsall

[11] Patent Number: 5,701,741
[45] Date of Patent: Dec. 30, 1997

[54] TURBOCHARGERS FOR INTERNAL COMBUSTION ENGINES

[75] Inventor: Philip S. Halsall, Shevington, United Kingdom

[73] Assignee: AlliedSignal, Inc., Morristown, N.J.

[21] Appl. No.: 481,406

[22] PCT Filed: Nov. 11, 1994

[86] PCT No.: PCT/GB94/02482

§ 371 Date: Sep. 8, 1995

§ 102(e) Date: Sep. 8, 1995

[87] PCT Pub. No.: WO95/13462

PCT Pub. Date: May 18, 1995

[30] Foreign Application Priority Data

Nov. 11, 1993 [GB] United Kingdom ............. 9323340

[51] Int. Cl.⁶ .................................................. F02B 37/12
[52] U.S. Cl. .................................................. 60/602
[58] Field of Search ............... 60/600–602; 123/564; 251/129.11, 264–267

[56] References Cited

U.S. PATENT DOCUMENTS

| | | | |
|---|---|---|---|
| 2,354,573 | 7/1944 | Brock | 251/129.11 |
| 2,477,668 | 8/1949 | Sparrow | 60/600 |
| 4,097,786 | 6/1978 | Lund | 251/129.11 |
| 4,174,617 | 11/1979 | Karchay | 60/602 |
| 4,280,680 | 7/1981 | Payne | 251/175 |
| 5,174,119 | 12/1992 | Hanauer et al. | 60/602 |

FOREIGN PATENT DOCUMENTS

| | | | |
|---|---|---|---|
| 3005108 | 8/1981 | Germany | 60/602 |
| 62-93428 | 4/1987 | Japan | 60/602 |

Primary Examiner—Michael Koczo
Attorney, Agent, or Firm—Felix L. Fischer

[57] ABSTRACT

A turbocharger has a drive-shaft mounted in bearing means in a housing. The drive shaft drivably connects an exhaust gas driven turbine wheel to the impeller of an air compressor 22. A gas flow control device, such as a wastegate 10, 39 and/or a variable geometry turbine inlet nozzle, positioned upstream of the turbine wheel is operable to adjust the operating performance of the turbocharger. An electrically drivable actuator motor 17, 45, such as a D.C. motor or a stepper motor, is provided for regulating the operation of the gas flow control device via a linkage means 14, 15, 405, 407, 406, 825, 830, 835 in response to an electrical signal dependent at least upon the delivery pressure of the compressor. In a preferred arrangement the linkage means includes a relatively rotatable threaded lead screw 15 and a correspondingly threaded female screw member 14 threadably engaged therewith.

10 Claims, 5 Drawing Sheets

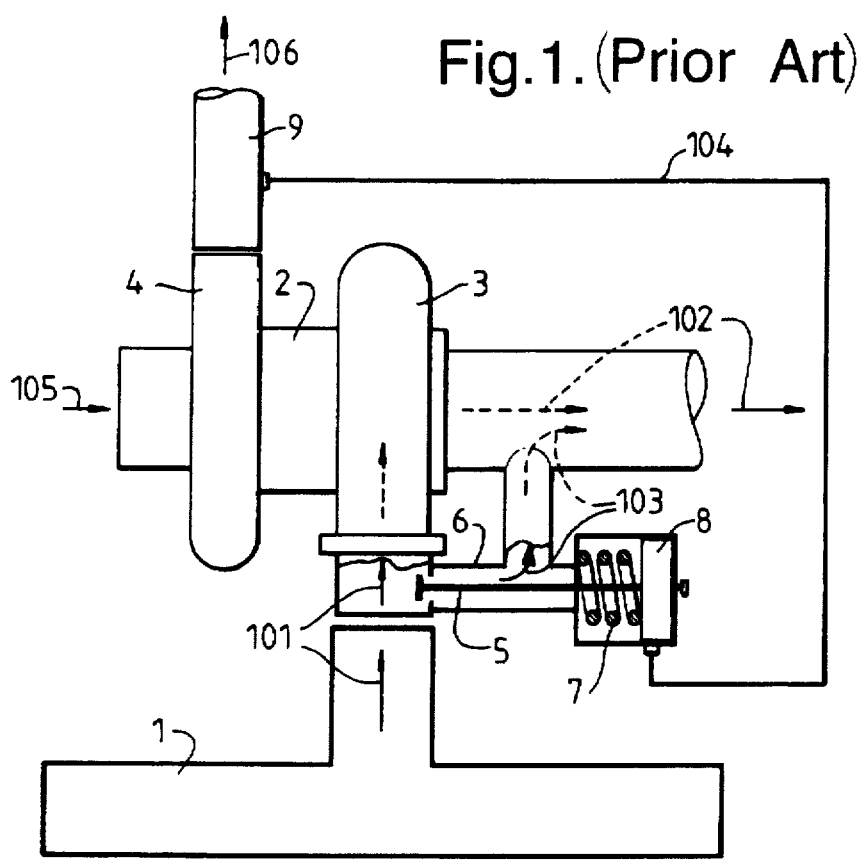
Fig. 1. (Prior Art)
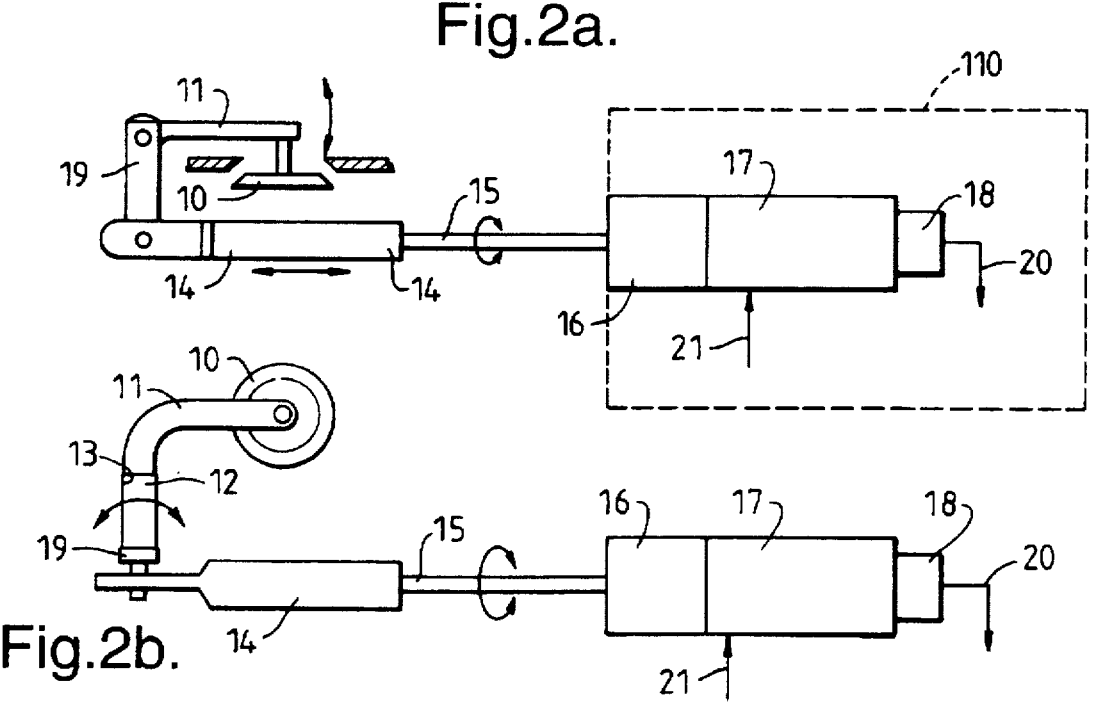
Fig. 2a.
Fig. 2b.

TURBOCHARGERS FOR INTERNAL
COMBUSTION ENGINES

This invention relates to turbochargers for internal combustion engines and relates more particularly to the control of the exhaust gas driven turbine of a turbocharger.

With the increase in popularity of compression ignition engines, particularly in passenger cars and light commercial vehicles, there is an incentive to provide small turbochargers for such engines to enhance their power output. With a well designed turbocharger a compression ignition engine can produce a power output which is similar to an engine of much larger capacity. Moreover the environmental cleanliness and fuel consumption may even show improvements relative to petrol engines. Again, a turbocharger employed on a petrol engine can greatly increase its power output.

A typical exhaust gas driven turbocharger comprises a bearing housing assembly supporting a rotatable shaft, one end of which carries an air compressor wheel enclosed by a compressor housing and the other end of which carries a turbine wheel enclosed by a turbine housing and which is subjected to exhaust gas flow to drive the compressor.

In order to constrain the boost pressure which such a turbocharger can produce at the air induction manifold of the engine, it has been proposed to provide a so-called "wastegate" including a controllable exhaust gas by-pass valve. Typically, such a wastegate valve has comprised a spring biased poppet valve having a valve stem connected to a pressure responsive diaphragm subject, in a valve opening direction, to a control pressure derived from the output of the turbocharger compressor. By providing such a wastegate it is possible to prevent a turbocharger from overboosting and advantageously to improve the matching of the operation of the turbocharger to the demands of the engine. However, the control thereby achieved is only approximate because the system is pneumatic and is dependent not only upon the boost pressure but also upon the value of a spring bias, the effective control areas and the exhaust gas pressure acting on the valve. In practice such control is only a compromise consistent with providing reasonable engine performance whilst preventing possible damage to the engine due to overboosting.

An alternative form of turbocharger control has also been proposed in which the input nozzle geometry of a drive turbine of a turbocharger is variable. One form of such a variable input nozzle is described in EP-A-0 571 205 published on 24 Nov. 1993, the disclosure of which is incorporated herein by way of reference. In such a proposal the turbine housing of the turbocharger has an inlet nozzle for receiving exhaust gases from an engine and is shaped to conduct such gases to impinge upstream edges of blades of a turbine wheel. The nozzle has axially spaced side walls extending about said upstream edges of the turbine wheel and axially extending spaced and angled vanes traverse the space defined between the side walls and are carried by one side wall and are receivable in slots in the other side wall. One side wall is formed by one end of an axially movable sleeve slidably carried in a bore of the housing downstream of the turbine wheel and means are provided axially to move the sleeve to thereby vary the geometry of said nozzle in response to air pressure derived from the output of the turbocharger compressor. Again, as in the case of a wastegated turbocharger, pneumatic control of the variable nozzle geometry is dependent upon fixed and variable parameters and these may be less than ideal for all operating conditions of the engine.

An object of the invention is to provide a turbocharger for an internal combustion engine with an improved control mechanism which better lends itself to respond to the requirements of the respective internal combustion engine.

According to one aspect of the present invention there is provided a turbocharger comprising a drive-shaft mounted in bearing means in a housing, the drive-shaft drivably connecting an exhaust gas driven turbine wheel to the impeller of a compressor, a gas flow control device positioned upstream of the turbine wheel and operable to adjust the operating performance of the turbocharger, and an electrically drivable actuator motor for regulating the operation of the gas flow control device via a linkage means in response to an electrical signal dependent at least upon the delivery pressure of the compressor, the linkage means comprising a male threaded lead screw and a correspondingly threaded female screw member threadably engaged therewith.

In a preferred arrangement one of the female threaded screw member and male threaded lead screw is arranged to move generally linearly on rotary motion of the other of said screw member and said lead screw when driven by the actuator motor, to change the longitudinal extent of the linkage means. It is preferably the lead screw that is rotated by driving of the actuator motor and the screw member which moves generally linearly. The lead screw may advantageously be provided with a multistart thread.

According to a further aspect of the present invention there is provided a turbocharger comprising a drive-shaft mounted in bearing means in a housing, the drive-shaft drivably connecting an exhaust gas driven turbine wheel to the impeller of a compressor, a gas flow control device positioned upstream of the turbine wheel and operable to adjust the operating performance of the turbocharger, and an electrically drivable actuator motor for regulating the operation of the gas flow control device via a linkage means in response to an electrical signal dependent at least upon the delivery pressure of the compressor, the linkage means comprising a fixed length linkage, a motor output crank arm pivotally connected to the linkage and a further crank arm pivotally connected to the linkage at a different position to said motor output crank arm.

To allow for initial and tuning adjustment, the length of the fixed length linkage may be adjustable. In a preferred arrangement the two crank arms are positioned generally parallel to one another.

In both aspects of the present invention the gas flow control device may comprise a wastegate valve operable to by-pass around the turbine wheel exhaust gas from upstream of the turbine wheel. The gas flow control device may also be a variable geometry nozzle at the exhaust gas input to the turbine wheel.

In order that the invention may be more clearly understood and readily carried into effect the same will be further described, by way of examples, with reference to the accompanying drawings, in which:

FIG. 1 illustrates in partially sectioned schematic form a typical known form of wastegated turbocharger;

FIG. 2a and FIG. 2b illustrate diagrammatically, in top plan view and side elevation respectively, an embodiment of turbocharger wastegate valve and actuation mechanism in accordance with the present invention;

Figure 3A:
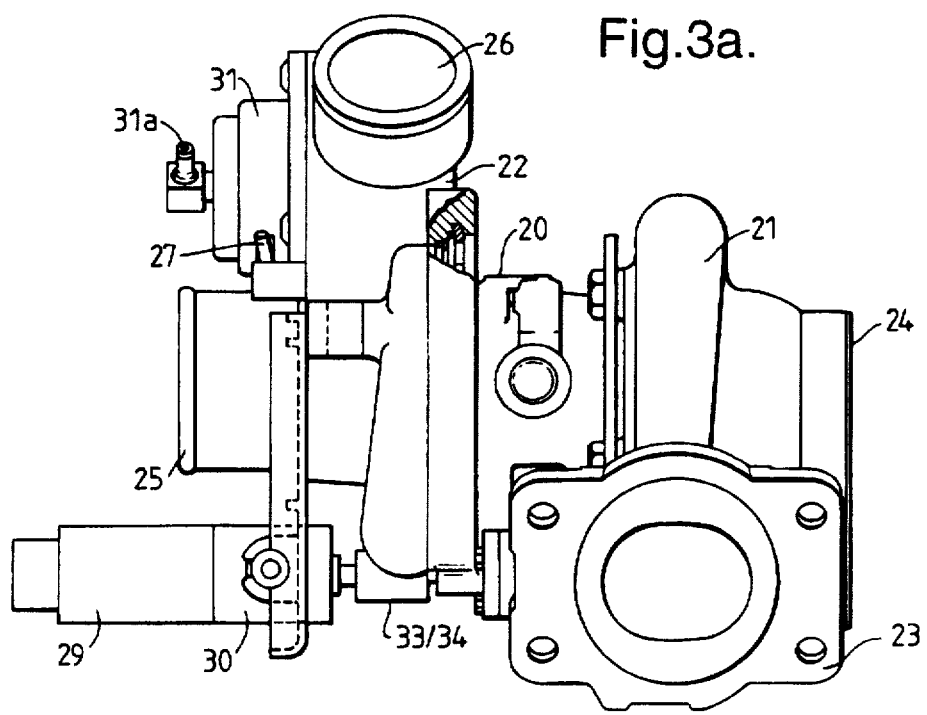
FIG. 3a, FIG. 3b and FIG. 3c illustrate, in side elevation and in opposite end elevations, a practical embodiment of a turbocharger in accordance with the present invention and in which the gas flow control device is a wastegate valve.

Referring to FIG. 1, the known wastegated turbocharger is illustrated connected to an exhaust manifold 1 of an internal combustion engine. The turbocharger comprises a bearing housing 2 within which a shaft (not shown), at one end, carries a turbine wheel in a turbine casing 3 and, at the other end, carries an air compressor impeller in a compressor casing 4. The inflow and outflow of exhaust gas into and out of the casing 3 are indicated by arrows 101, 102 and a wastegate valve 5 is connected in a side-flow or bypass path 6. When the wastegate valve 5 is opened, gas indicated by arrows 103, can flow via valve 5 and passage 6 to the main exhaust pipe of the vehicle without passing through the turbine casing 3. The wastegate valve 5 is biased in a closed sense by a spring 7 of a pneumatic actuator having a pressure responsive actuator 8 subject, via line 104, in a valve opening sense to the delivered pressure which exists in the engine air inlet 9 which is connected directly to the air output of the turbocharger compressor casing 4. The inflow to and outflow from the compressor casing 4 are indicated by arrows 105, 106 respectively. As discussed in the introduction, whilst the turbocharger of FIG. 1 with a wastegate is fairly simple in construction, it has shortcomings having regard to the wide range of operating conditions.

Referring to FIGS. 2a and 2b, in the shown general arrangement a gas flow control device is in the form of a wastegate valve. The valve member 10 of the wastegate valve is a poppet valve carried by a curved crank arm 11 pivoted via a shaft 12 in a pivot bearing 13 in a boss formed in the side of the turbine inlet duct (not shown). The outer end of the shaft 12 is connected via a further crank arm 19 to a threaded linkage. This linkage comprises a female lead screw nut 14, which may for example be made of steel or another suitable material, which has a female multistart thread threadably engaged with a multistart male lead screw 15. The rotatable lead screw 15, which may advantageously be made of brass or plastics material, is formed by the output shaft of a reducing gearbox 16 driven by an 12V electric DC motor 17. The gearbox 16 may, for example, have a 9:1 reduction ratio. The motor has an associated position encoder or potentiometer 18 having an output 20. Where, as in the illustrated embodiment, the motor is provided with a gearbox 16, the encoder or potentiometer 18 preferably senses the position of the gearbox output shaft. The encoder or potentiometer may advantageously be a linear or rotary potentiometer and may packaged in a water-resistant casing 110, such as shown in broken lines in FIG. 2a, together with the motor 17 and gearbox 16 to insulate the components from the elements and dirt etc. The casing may typically be made of plastics material and/or metal. The motor 17 responds via computation logic (not shown) at least to the encoder or potentiometer and a pressure signal derived from the compressor delivery.

In generalized operation, in the event of a tendency toward excessive delivered air pressure at the compressor outlet, as signalled to an electronic control unit (not shown), a signal voltage is provided at motor input 21 and rotation of the shaft 15 by the DC motor 17 via the gearbox 16 causes lengthening of the linkage formed by the lead screw 15 and nut 14, thereby unseating the valve member 10 to permit bypassing of exhaust gas flow directly to the turbine outlet without passing via the turbine itself. This system therefore operates in a sense to prevent excessive delivered air pressure and any accompanying compressor surge.

It will be appreciated that, during operation of the motor 17, part of the linkage (nut 14) moves in a generally linear direction, the nut 14 and shaft 15 having converted rotary motion of the motor output shaft into generally linear movement of the nut 14.

Figure 3B:
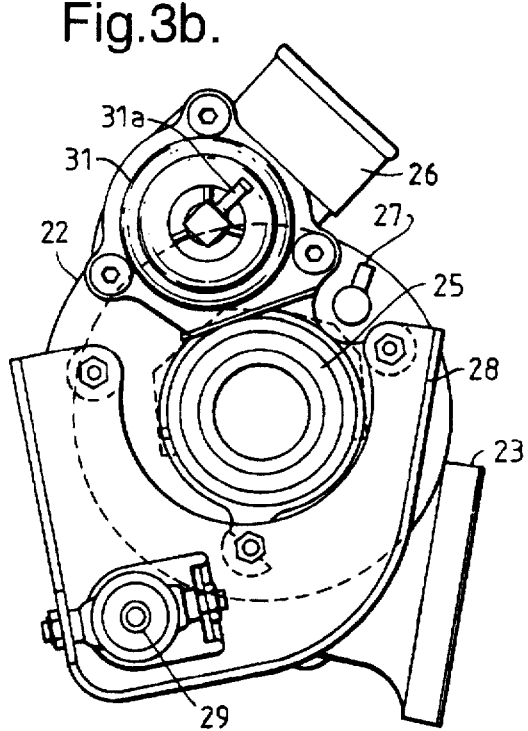
Figure 3C:
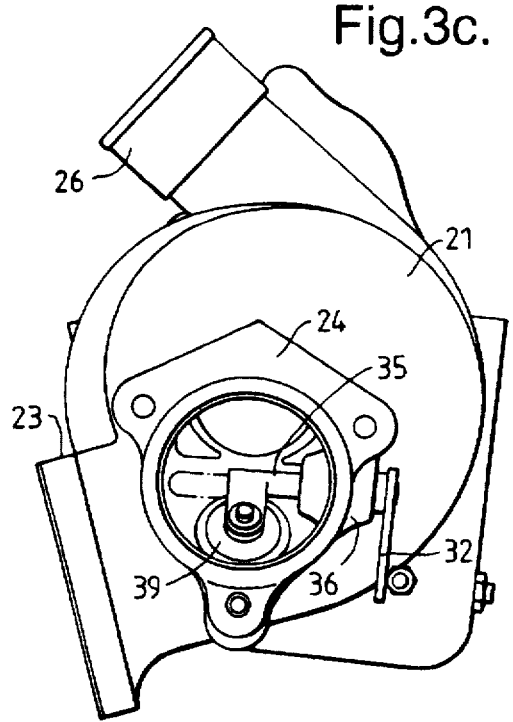

Referring to FIGS. 3a 3b and 3c the three views illustrated thereby show a practical example of a turbocharger in accordance with the invention including an electric DC motor 29 for controlling the gas flow control device, as postulated in FIGS. 2a and 2b. The turbocharger has a bearing housing 20 carrying the turbocharger shaft, one end of which projects into the attached turbine housing 21 to carry a conventional turbine wheel (not shown) and the other end of which projects into the compressor housing 22 and carries the conventional compressor impeller (not shown) driven via the shaft. The turbocharger is designed to be supported by the inlet flange 23 of the turbine housing, the turbine housing outlet 24 being connected to the engine exhaust system.

The compressor housing 20 has a generally axial air inlet port 25 for connection to an air inlet filter and a compressor air delivery port 26 for connection to the engine air induction system. Port 26 is also provided with a vacuum boost pressure inlet 27 via which signals as to the pressure pertaining in the compressor delivery may be derived. Although it forms no part of the present invention, the compressor housing also carries a recirculation valve 31 with a vacuum inlet 31a, to sense throttle opening and vary a bypass path for reducing surging. The compressor housing, being the normally cooler end of the turbocharger, also has a pressed steel bracket 28 attached to it. This bracket 28 supports the DC electric motor denoted by reference 29 and associated reducing gearbox 30 for activating the wastegate crank arm 32 via the lead screw arrangement 33, 34. The axis of rotation of the motor 29 is parallel to, but offset from, the axis of the turbocharger to assist packaging of the turbocharger device in an automobile engine bay. As seen in FIG. 3c, crank arm 32 is mounted on a shaft 35 passing rotatably through a boss 36 formed on the side wall of the turbine inlet duct and shaft 35 supports a wastegate poppet valve element 39 which, when shut against its seat, closes off the wastegate passage as discussed above with reference to FIGS. 2a and 2b.

Figure 4:
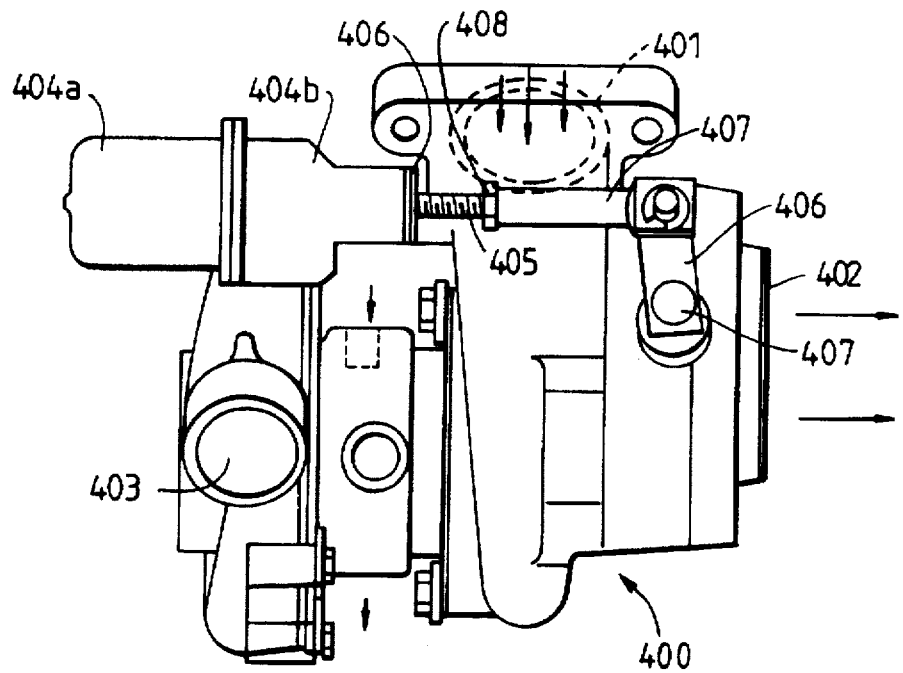
FIG. 4 illustrates, in side elevation, an alternative practical embodiment of a turbocharger in accordance with the present invention and in which the gas flow control device is a wastegate valve.

FIG. 4 shows a variation of the mechanism shown in FIGS. 3a, 3b and 3c. Elements of the generally similar turbocharger body 400 include turbine inlet 401, turbine outlet 402, and compressor inlet 403. In the embodiment illustrated in FIG. 4 the motor is a 12V D.C. motor and is associated with a reducing gearbox and a position sensing potentiometer, these three components being hidden from view inside a two-part weather-resistant housing 404a, 404b, this housing being mounted on the cooler compressor side of the turbocharger. This arrangement differs from that shown schematically in FIGS. 2a and 2b in that it is the female nut that is rotatably driven by the gearbox output and not the lead screw. In the arrangement illustrated in FIG. 4 the male lead screw/female nut arrangement is mostly contained within the right hand half of the housing 404b so that only the distal portion of the linearly moveable lead screw 405 is visible outside the housing 404a, 404b. The lead screw 405 passes through a rubber gaiter or grommet for an environmental seal 406 provided on the right hand half of the housing 404b. This arrangement has the advantage of the threads of the female nut (not shown) of the linkage means being contained within the housing 404, protecting them from contamination by water, dirt etc. The distal end of the distal portion of the lead screw 405 is threaded into a threaded extension 407 and locked thereto by a lock nut 408. The extension 407 is pivotally connected to a crank arm 406. The longitudinal extent of the linkage means may be adjusted by releasing lock nut 408 and screwing the lead screw 405 into or out of the extension 407, aiding initial set-up of the turbocharger. Pivoting of the crank arm 406 around its opposite end 407 opens and closes a wastegate valve (not shown) in a similar way to that described above.

In a further alternative, albeit more costly, non-illustrated configuration of a gas flow control mechanism in a turbocharger according to the invention, the lead screw arrangement may be dispensed with in favour of a rack and pinion linkage or some other arrangement. The pinion may be carried by the output shaft of the gearbox and the cooperating longitudinally movable rack may be connected at one end to the operating lever such as 32 of FIG. 3c.

In a yet further alternative construction of a gas flow control mechanism in a turbocharger according to the invention, wherein the DC electric motor used in the above described examples is replaced by an electric stepper motor, such motor is also readily controlled via an ECU and decoder to act via a gearbox. Indeed, other combinations of alternative features such as discussed here will be readily apparent to those familiar with mechanical drive mechanisms and linkages. In addition to DC motors, of either brushed or brushless type and stepper motors, switch reluctance technology may alternatively be employed.

Figure 5:
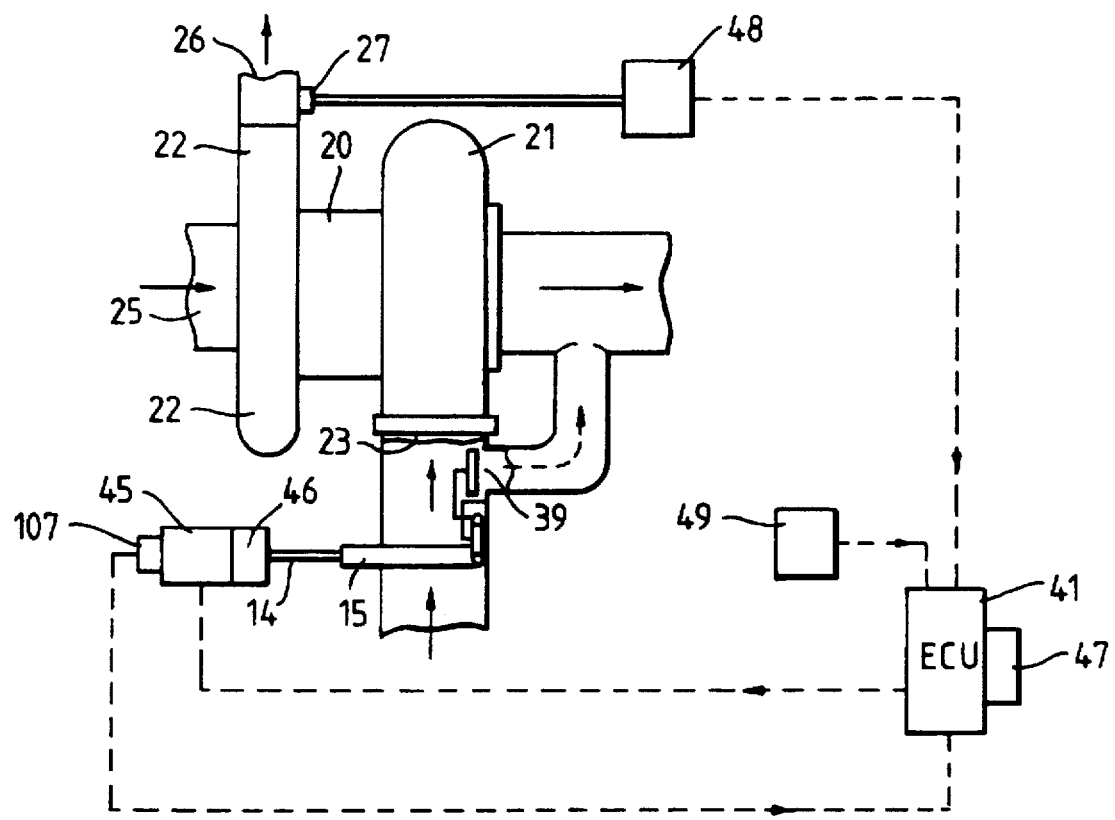
FIG. 5 illustrates, in diagrammatic manner, an embodiment of a turbocharger according to the present invention together with control means for the gas flow control device.

In considering more detailed operation of the turbochargers described above with reference to FIGS. 2 to 4, reference may be had to FIG. 5 which diagrammatically illustrates a system including an electronic control unit (ECU) 41. In an automotive application the ECU may advantageously also deal with ignition timing, fuel injection and the like in a manner well known in the art. In FIG. 5 the turbocharger is again designated diagrammatically at 20, 21, 22 providing air induction and boosted air pressure at ports 25 and 26 respectively of a compressor driven by exhaust gas at 23 from the engine manifold. The wastegate valve 39 described in more detail above is actuated via the electric actuator motor 45, gearing 46 and lead screw linkage arrangement 14, 15. Operation of the electric actuator motor is controlled by an electric signal from the ECU 41, which is responsive to electrical input signals derived from a boost pressure transducer 48, an engine speed transducer 49 and the motor/gearbox position encoder or potentiometer 107. The electrical connections are indicated by broken lines. The ECU operates according to an electronic mapping element 49 fitted for the particular engine. In order to achieve control of the wastegate gas flow which is appropriate for given engine applications, engine mappings are created typically of required wastegate actuator settings for all combinations of required air pressure boost relative to engine speed. In turn, the required boost pressure itself is dependent upon throttle setting, turbine inlet temperature and air mass flow rate. Accordingly, the ECU is preferably also supplied with input analogue signals from transducers giving such values and the engine mappings 47 includes the control tables required to be used for the required engine application.

Figure 6:
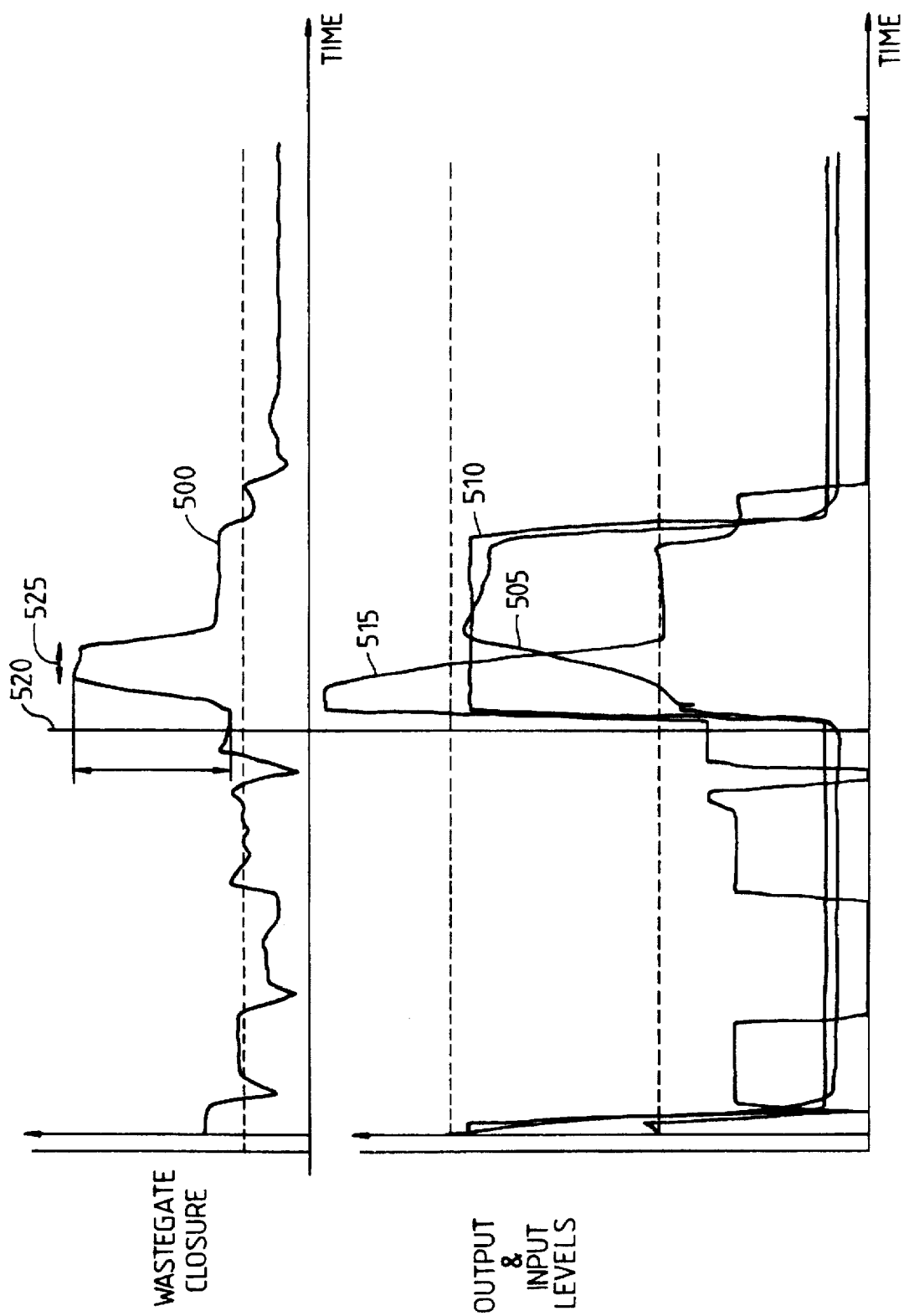
FIG. 6 is a response map obtained during a test conducted on a engine fitted with a turbocharger in accordance with the present invention in which an actuator motor having a lead screw linkage arrangement was used to control the position of a wastegate valve.

FIG. 6 is a response map obtained during a test on an engine fitted with a turbocharger in accordance with the present invention. The top trace 500 on the map traces wastegate position (vertical axis) against time (horizontal axis). The higher the trace the more closed is the wastegate.

The lower two thirds of the map show time-coincident traces of actual compressor delivery (boost) pressure 505, desired boost pressure 510 and a pulse width modulated actuator motor drive signal 515. The other unreferenced traces in this lower plot may be ignored.

The plotted test was conducted at a constant engine speed, approximately 3500 rpm.

In the center of the trace, just to the right of the vertical line 520, it can be seen that as the desired boost pressure 510 steps up sharply the motor drive signal 515 progressively closes the wastegate (trace 500), increasing the actual boost pressure 505 towards the desired value 510. The wastegate stays closed for a time (at 525) before being re-opened as the actual boost pressure 505 reaches the desired boost pressure value 510.

It is of particular practical significance in a turbocharger assembly that actuation of the wastegate and/or variable geometry turbine input nozzle may be effected by an electric motor because such a motor of light construction and with low friction can provides fast response to changes in engine operating parameters as reflected by the ECU control signal. It has also been found to be preferred that the drive mechanism shall include a gearbox and a multistart lead screw arrangement due to the smoothness of operation and the advantage of little or no reverse force being transmitted through it when stationary. A suitable multistart thread may have typically 10 or 12 starts and a lead screw gradient of approximately 10 mm per revolution. Such an arrangement can contribute to a durable, low friction and low-cost actuation mechanism. Particularly when the motor is a simple DC motor, which type of motor has a high static load, such a mechanism may need only to be energised when actuation is required so the power consumption is zero for much of the engine operating time. This also helps achieve a long service life.

Figure 7:
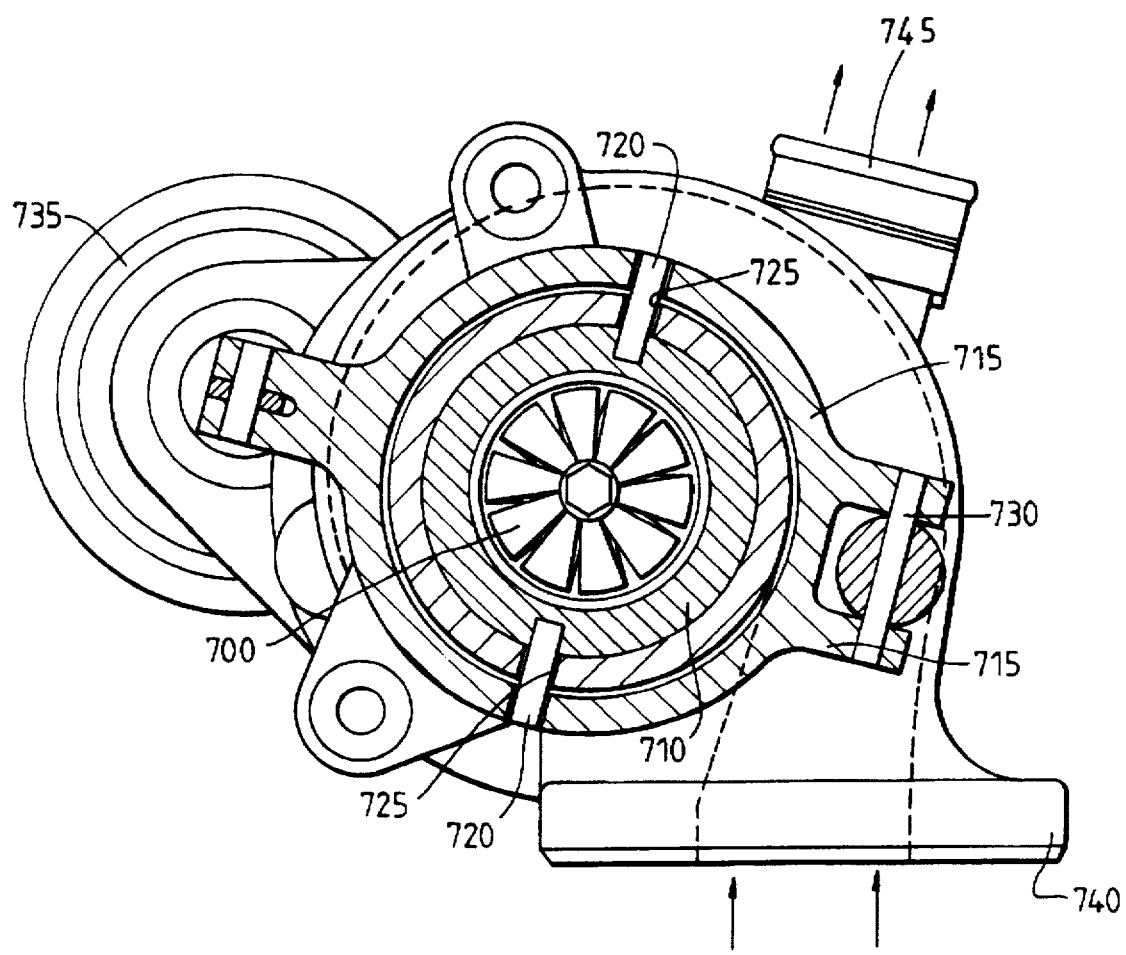
FIG. 7 illustrates, in sectioned elevation, an embodiment of a variable geometry turbine inlet nozzle turbocharger in accordance with the present invention.

It will be readily apparent from the foregoing that a gas flow control mechanism using an electric DC motor, or stepper motor or the like, as described in the foregoing, may in an alternative embodiment of an application of the invention alternatively or additionally be employed in a turbocharger with a variable geometry input nozzle such as described in the aforementioned EP-A-0 571 205. FIG. 7 is a modified version of one of the figures from EP-A-0 571 205, the disclosure of which document is incorporated herein by way of reference. FIG. 7 is an axial cross-section through the turbine outlet of the turbocharger, showing the turbine wheel 700. The turbocharger has an engine manifold mounting flange 740, a compressor outlet 745 and a generally cylindrical sleeve member 710 which is axially movable in the direction of the drive shaft of the turbocharger in order to change the geometry of the turbine input nozzle (not shown). To achieve this sliding a control yoke 715 is provided. Pins 720 project radially inwardly from the control yoke 715, through elongate holes 725, into the sleeve member 710. A portion of the yoke 715 is provided with a pivot pin 730 about which the yoke may be tilted. In the arrangement illustrated in EP-A-0 571 205 tilting of the yoke 715 is achieved using a pneumatic actuator. In FIG. 7 the pneumatic actuator of the arrangement disclosed in EP-A-0 571 205 may be thought of as being replaced by an electrically drivable actuator motor 735, and linkage means of the sort hereinbefore described. This actuator motor may thus be used to vary the geometry of the input nozzle to the turbine. Although the precise construction of the linkage means for transmitting actuator motor drive to the yoke 715 is not apparent from FIG. 7, the linkage means provided for this purpose may be of any of the forms hereinbefore described.

In the FIG. 7 embodiment the gas flow control means that varies the geometry of the turbine inlet nozzle is movable axially in the direction of the drive shaft of the turbocharger. In an alternative construction of a variable geometry turbine inlet nozzle it may be necessary to provide an alternative form of drive.

I claim:

1. Turbocharger comprising a drive-shaft mounted in bearing means in a housing, the drive-shaft drivably connecting an exhaust gas driven turbine wheel to the impeller of a compressor, a gas flow control device positioned upstream of the turbine wheel and operable to adjust the operating performance of the turbocharger, and an electrically drivable actuator motor for regulating the operation of the gas flow control device via linkage means in response to an electrical signal dependent at least upon delivery pressure of the compressor, the linkage means comprising a male threaded lead screw having a multistart thread and a correspondingly female threaded screw member threadedly engaged therewith and one of said screw member and lead screw being arranged to move generally linearly, substantially parallel to an axis of the drive-shaft, on rotation of the other of said screw member and lead screw by the actuator motor, thereby converting said rotation into movement of the gas flow control device.

2. A turbocharger as claimed in claim 1, wherein the female screw member is rotated by driving of the actuator motor.

3. A turbocharger as claimed in claim 1, wherein the generally linearly movable one of said threaded lead screw and said screw member is provided with means for adjusting the longitudinal extent of the linkage means.

4. A turbocharger as claimed in claim 1, wherein the gas flow control device comprises means for varying the geometry of a nozzle at an exhaust gas input to the turbine wheel.

5. A turbocharger as defined in claim 4 wherein the linkage means further includes a yoke having an attachment operably interconnected to the lead screw for linear translation in response to linear translation of the lead screw and the means for varying the geometry comprises a cylindrical sleeve and means for connecting the sleeve to the yoke.

6. A turbocharger as defined in claim 5 wherein the yoke includes a pivot distal from the attachment for rotation of the yoke in response to the linear translation of the lead screw and the means for connecting the sleeve to the yoke comprises two pins extending radially inward with respect to an axis of translation of the sleeve and engaging the sleeve.

7. A turbocharger as claimed in claim 1, wherein the actuator motor comprises a DC motor.

8. A turbocharger as claimed in claim 1, wherein output of the actuator motor passes to the linkage means through a reducing gearbox.

9. A turbocharger as claimed in claim 1, wherein the linkage means is arranged to translate rotary motion of an output shaft of the actuator into generally linear movement of the gas flow control device.

10. A turbocharger as claimed in claim 1, wherein an axis of rotation of the actuator motor is positioned generally parallel to, and offset from, an axis of the turbocharger drive-shaft.

* * * * *